Patented Dec. 25, 1951

2,579,576

UNITED STATES PATENT OFFICE 2,579,576

CRACKING WITH ACID-TREATED CLAY CATALYST

John H. Hickey, Morton Grove, Ill., assignor to Great Lakes Carbon Corporation, Morton Grove, Ill., a corporation of Delaware No Drawing. Application August 17, 1949, Serial No. 110,880

3 Claims. (Cl. 196—52)

This invention relates to a process for activating clays. More particularly, the invention relates to a process for producing activated clay catalysts and the conversion of hydrocarbon materials.

It is common practice to employ certain types of clays belonging to the bentonite family, which clays can be converted into active catalysts for the conversion of hydrocarbons. Such catalysts are useful, for example, in processes such as catalytic cracking, reforming, polymerization, and alkylation, etc.

In general, the procedures which have been employed for activating clays of the bentonite type include digesting the clay with a mineral acid of suitable concentration, usually at elevated temperatures. The reaction is carried out until the desired amounts of certain of the clay components have been removed from its lattice structure. More particularly, the process of clay activation as generally understood involves a removal of (1) certain detrital matter such as carbonates of magnesium, calcium and iron, (2) base-exchangeable ions, (3) lattice water, (4) a portion of the lattice magnesium, (5) a portion of lattice aluminum, and (6) a minor portion, if any, of lattice silicon. Under activating conditions heretofore employed the removal of the foregoing materials has been carried out more or less simultaneously in employing acid dosages of various concentrations, usually at elevated temperatures.

It is an object of the present invention to provide an improved process for hydrocarbon conversion employing in such process catalysts having improved activity.

It is a further object of the invention to provide activated clays having high catalytic activity and heat stability when employed in hydrocarbon conversion processes.

It is a further object of the invention to provide improved clays which are useful as adsorbents for liquids and gases as well as for the aqueous or organic impurities present in oils, fats, petroleum products, etc., or as decolorizing agents for edible oils, impure sugars and other compositions.

The above objects as well as others which will become apparent by more complete understanding of the invention as subsequently herein described are accomplished by employing a novel sequence of steps in the treatment of bentonite clays with mineral acids under particular conditions of temperature and acid concentration, thereby producing activated clays having improved catalytic activity and heat stability. The instant novel process is characterized by a multi-stage treatment of bentonite clays, the first stage comprising treating the clay with a relatively cool aqueous solution of mineral acid, thus reacting the acid with the clay, and subsequently separating the resulting solution from the insoluble portion of the clay. The latter product is subsequently treated one or more times at elevated temperatures with an aqueous solution of acid or acids, thereby effecting a further reaction of the acid with the clay. The insoluble clay portion is then separated from the resulting mixture and is washed with suitable amounts of water.

More particularly, a method of producing the activated clay compositions of the present invention which are suitable for use as catalysts in hydrocarbon conversion processes comprises treating bentonite clays at a temperature between about 10° and about 40° C. with an aqueous solution of a mineral acid whose concentration is between about 2 and 15% by weight and thereafter separating the resulting solution from the insoluble clay material. The latter product is then treated with additional portions of mineral acid having a concentration of between 5 and 15% by weight, said treatment being conducted at a temperature between about 80° C. and the boiling point of the mixture. After a suitable period of time, the resulting insoluble material is separated from the acidic solution, washed with water and is then dried and calcined at suitable temperatures to produce catalysts of improved activity.

Bentonite clays such as montmorillonite are generally employed in practising the instant novel process although there are other clay compositions in which montmorillonite occurs and the latter may also be similarly activated by the process described herein. These clays have a definite micro-crystalline structure in which the elements of magnesium, aluminum, and silicon form a part of the crystal lattice. In the interplanar areas between the lattices in addition to a variable amount of water there are also present elements such as the alkali metals, as well as calcium and magnesium, and traces of others which are associated with the lattice in a base-exchange relationship. The structure of the clay can further be described as previously set forth herein and the multi-stage treatment with acids employed in the instant novel process accomplishes the removal of a certain portion of these substances.

It has now been found that when the clay is conditioned by first reacting it with aqueous mineral acid under particular conditions which remove the previously herein described clay components (1) and (2), or renders them amenable to removal by subsequent treatment with acid, an appreciably improved activation of the clay occurs. The clay which has been subjected to initial acid treatment is separated from the acidic solution and is then further activated by subjecting it to an additional treatment with mineral acid at elevated temperatures as hereinbefore described. In this manner catalysts having activity considerably improved over acid-activated clays heretofore produced are obtained.

A characterizing feature of the instant process is the particular method by which the clay is first treated or "conditioned" for activation. This comprises reacting the clay, preferably in a comminuted or pulverized condition, with mineral acid of suitable dilution and at a relatively cool temperature. Temperatures may be between about 10° and 40° C. and such temperatures have been found to be critical for the preliminary or first stage treatment. The concentration of acid generally employed is about 2 to 7% by weight, preferably about 2.5 to about 5%.

In an alternative procedure it is sometimes desirable to first mull the raw clay to a smooth paste with a higher concentration of acid, namely between about 7% and about 15% by weight, preferably about 10%, and immediately thereafter adding water in amounts sufficient to reduce the acid concentration to about 2% to 5% by weight, followed by completing the reaction with the clay. The amount of anhydrous acid employed in solution per pound of clay on a volatile matter-free basis is generally slightly in excess of that required to react with detrital matter such as the carbonate products hereinbefore described, and to some degree with the base-exchange elements or interplanar impurities present in the clay lattice structure. The excess of acid does not accomplish any appreciable removal of lattice ions from the clay.

The amount of anhydrous acid which is required in aqueous solution together with a sufficient excess will be between about 0.05 to about 0.15 pound of anhydrous acid per pound of clay on a volatile matter-free basis, depending upon the composition of the particular clay involved. The time of contact of the aqueous acid with the clay will be between about 15 and 60 minutes.

The above described process does not substantially effect the activity of the clay insofar as its catalytic properties are concerned. However, the clay is thereby conditioned so that when it is subjected to treatment with further amounts of acid at elevated temperatures, there results a markedly improved activated clay material.

Following the above described treatment with dilute aqueous acid at a relatively low temperature, the reacted clay is separated such as by a settling and decanting operation, centrifugation, or other suitable means, from the resulting solution which contains solubilized clay products. To secure the improved activation afforded by the instant novel process, at least one second treatment with an additional supply of aqueous mineral acid is then employed. The reacted clay from the first acid treatment need not be washed to remove a slight excess or residual amount of acid but may be directly treated or conditioned by further additions of mineral acid.

The second or activating step insofar as catalytic activation is concerned involves treating the foregoing reacted clay with an aqueous mineral acid solution at elevated temperatures between about 80° C. and the boiling point of the acid-clay mixture. The concentration of acid here employed is between about 5 and 15% by weight, preferably about 10%. The amount of anhydrous acid employed in solution per pound of clay on a volatile matter-free basis will be between about 0.1 and about 0.6 pound. The reaction of the acid in this step results in the activation of the bentonite clay, presumably due to the removal of a portion of the aluminum present in the crystal lattice. As much as about 60% of lattice aluminum may be removed before disintegration of the lattice commences and catalytic activation is appreciably reduced. A maximum level of clay activation will be between about 20% and about 45%. In order to secure maximum yields of activated clay amounting to about 80 to 85% of raw clay, on a dry basis, it is preferable to remove only about 30% of lattice aluminum and for this reason it is preferable to employ in this step of the process about 0.3 to about 0.4 pound of anhydrous mineral acid per pound of initially reacted clay on a volatile matter-free basis. The concentration of acid is preferably about 10% by weight. The contact time of the acid with the clay may be between about 5 and about 7 hours. The resulting activated clay is then washed with water in order to remove unreacted acid and soluble impurities from the clay. The washed material may then be dried at suitable temperatures, for example, between 100° and 120° C., and may then be calcined at a temperature between about 400° and 600° C. to produce a catalyst. The calcining temperature is usually dependent upon the particular process in which the catalyst is to be used.

In conducting the acid treating operations herein described, the same or different mineral acids may be employed in the separate operations. For example, hydrochloric acid may be employed in the initial acid treatment at relatively low temperatures and sulfuric acid may be employed thereafter in the treatment at elevated temperatures, or either hydrochloric or sulfuric acids may be used in both processes. Other acids such as nitric or phosphoric acid may be employed, although not with fully equivalent results. The reacted clay should be drained free of the first reacted acid solution or washed with water prior to the addition of the second quantity of acid solution employed for activation at elevated temperature.

It has been found that the catalytic activity and heat stability of the activated clays produced in accordance with the instant novel process are superior to present commercially available activated clay materials for the catalytic conversion of petroleum distillates such as gas oil. In general, the catalysts presently available are produced by the direct treatment of bentonite clays with mineral acids at elevated temperatures, usually at 90° to 105° C. Use of a 15% sulfuric acid solution is quite prevalent. The acid-treated materials are washed, dried and subjected to a grinding operation followed by calcination. It has been found that even under the best conditions of clay activation heretofore employed, the development of optimum activity and heat stability of bentonite cannot be obtained by such methods.

The activated clays described herein are especially useful in the conversion of hydrocarbons, for example in such processes of catalytic cracking of gas oils and similar materials for the production of high octane motor fuels; polymerization of olefins, reforming thermally cracked or olefinic gasoline, for improvement of octane number, hydrogen transfer reactions for reducing the olefin content of light petroleum distillates, etc. For example, the catalytic reforming of an olefinic gasoline to improve its octane number is carried out by subjecting a thermally cracked gasoline having an octane number of 67 to the action of an activated clay catalyst produced in accordance with the instant novel process at a temperature of about 500° C. at a space velocity of 5 volumes of liquid weight per volume of catalyst. Such an operation results in a gasoline having an octane number of 69.5.

In the cracking of gas oil or similar materials, such products are subjected to the action of the catalysts herein described at temperatures between about 700° and about 1100° C. thus producing substantially improved yields of cracked products in comparison with the results obtained by presently employed commercially available acid-activated bentonite clays.

In the examples subsequently set forth herein, a bentonite clay was obtained in a comminuted state (substantially all passing through 100 mesh) from a typical deposit such as is present at Ash Meadows. It was treated with dilute hydrochloric or sulfuric acids at relatively low temperatures and/or at elevated temperatures of about 80° C. to the boiling point of the acid-clay mixture. In the case of dual acid treatment, the acidic solution obtained by activation at relatively low temperatures was removed from the reacted mixture prior to acid activation at elevated temperatures. The clay had an initial average water content of about 5 to 8% prior to acid activation. The activation procedure employed to produce the catalyst employed in the following illustrative examples involves treating 100 parts by weight of comminuted bentonite clay with about 70 parts by weight of a 10% aqueous solution of hydrochloric acid. The clay and acid were mulled to a smooth paste at room temperature (about 25° C.) followed immediately by the addition of about 200 parts by weight of water at approximately the same temperature. The resulting mixture was agitated for about 30 minutes and filtered. The filter cake was then treated with about 400 parts by weight of 40% aqueous solution of sulfuric acid at the boiling point of the mixture for about 6 hours. An additional amount of water was added and the mixture was filtered and washed with additional amounts of water. The activated clay was substantially free from nonreacted acid and water-soluble impurities. The washed material was dried and in the event that it was to be employed as a cracking catalyst, was calcined at a temperature of about 500° C. in an air atmosphere.

A Mid-Continent gas oil having a specific gravity of 0.831 was contacted with the catalyst at a temperature of about 500° C. at atmospheric pressure with a feed rate of about 5.25 volumes of gas oil per volume of catalyst per hour. The activation of the catalysts are described as "initial" and "after heating to 700° C." Initial activation refers to the activity of acid treated bentonite clay after calcination to 500° C. and is expressed in per cent in comparison to the activity of a calcined, commercially available acid activated bentonite clay (Example 1). The latter material was arbitrarily assigned a value of 100% activity. Activity "after heating to 700° C." was determined after calcination of an acid treated bentonite clay at 700° C. for about 6 hours and then employing the calcined product as a catalyst in cracking operations. The values stated in the column "after heating to 700° C." indicate the life expectancy of the catalyst during the cracking cycle as such temperatures are frequently obtained in the reactivation of the catalyst by oxygen-containing gases in accordance with well-known procedures. Such reactivation is necessary due to the contamination of the catalysts with carbonaceous deposits during the cracking operation The activity of the activated clay catalysts was determined in accordance with the procedure described in my co-pending patent application, S. N. 681,603, now Patent No. 2,484,828, of which the present application is a continuation-in-part.

Example 1 in the table below is a typical commerical bentonite clay which has been treated with sulfuric acid (10 to 15% $H_2SO_4$ concentration) at elevated temperatures, for example about 90° to 100° C., followed by washing and drying the activated material at about 500° C.

The other examples in the table illustrate various methods of acid treatment, including the herein described novel activation process (Examples 5 and 6).

After repeated working operations, processing and regeneration at temperatures between 600° and 700° C. the activity of the catalyst used in Examples 5 and 6 remains substantially above its heat stability value of 87 with no appreciable loss in activity. It is in this property as well as in the initial activity that the activated clays herein described are superior to other commercially available bentonite catalysts.

The above examples clearly illustrate the advantages of the acid activation of bentonite clay by means of a multi-stage process, the first acid treatment being at relatively low temperatures, followed by at least one second activating step with aqueous mineral acids at elevated temperatures. Both the initial activity of the catalyst and that after calcination at 700° C. are substantially improved over those observed for the catalysts produced by means of either one or two stage treatments at elevated temperatures. The results obtained in Examples 5 and 6 in accordance with the instant novel process indicate that substantial advantages accrue in conducting the first activation at relatively low temperatures followed by at least one second activation procedure at elevated temperatures.

| Example No. | First Acid Treatment | | | | Second Acid Treatment | | | | Per Cent Activity | |
|---|---|---|---|---|---|---|---|---|---|---|
| | Temp., °C. | Acid | Acid Dosage [1] | Acid Conc. | Temp., °C. | Acid | Acid Dosage [1] | Acid Conc. | Initial | After Heating at 700° C. |
| | | | | Per cent | | | | Per cent | | |
| 1 | B. P. | $H_2SO_4$ | 0.30 | 15.0 | | None | | | 100 | 53 |
| 2 | B. P. | HCl | 0.30 | 10.00 | | do | | | 96 | 73 |
| 3 | 80 | HCl | 0.30 | 10.00 | | do | | | 97 | 83 |
| 4 | Room | HCl | 0.30 | 10.00 | Room | HCl | 0.30 | 10.0 | 76 | 52 |
| 5 | do | HCl | 0.07 | 10.00 | B. P. | $H_2SO_4$ | 0.30 | 10.0 | 140 | 87 |
| 6 | do | $H_2SO_4$ | 0.10 | 10.0 | B. P. | $H_2SO_4$ | 0.40 | 10.0 | 138 | 89 |
| 7 | B. P. | $H_2SO_4$ | 0.10 | 10.0 | B. P. | $H_2SO_4$ | 0.27 | 10.0 | 102 | (2) |
| 8 | B. P. | $H_2SO_4$ | 0.10 | 10.0 | Room | HCl | 0.07 | 10.0 | 103 | (2) |

[1] Expressed as lbs. HCl/lb. moisture free clay.
[2] Not determined.

Having thus fully described and illustrated the nature and character of the invention, what is desired to be secured by Letters Patent is:

1. A process for cracking hydrocarbon oils which comprises passing the oil to be cracked through a cracking zone containing a catalyst comprising essentially a bentonite clay activated by reacting said clay at a temperature between about 10° and about 40° C. with about 0.05 to about 0.15 pound of a mineral acid per pound of clay, said acid being of about 2% to about 15% concentration in water, separating the resultant solution from the clay, further reacting the clay with an aqueous solution of a mineral acid of about 5% to about 15% concentration in an amount corresponding to about 0.1 to about 0.6 pound of concentrated acid per pound of clay, at a temperature of about 80° C. to the boiling point of said solution, separating the resultant solution from the clay, washing the clay, and then drying it.

2. A process according to claim 1 wherein the acid employed is sulfuric.

3. A process according to claim 1 wherein the acid employed is hydrochloric.

JOHN H. HICKEY.

REFERENCES CITED

The following references are of record in the file of this patent:

UNITED STATES PATENTS

| Number | Name | Date |
|---|---|---|
| 2,326,704 | Thiele et al. | Aug. 10, 1943 |
| 2,484,828 | Hickey | Oct. 18, 1949 |